Aug. 21, 1962

E. NATHAN 3,050,181

SPECTACLE CASE

Filed Jan. 27, 1961

2 Sheets-Sheet 1

INVENTOR
E. NATHAN

BY

ATTORNEY

Aug. 21, 1962 E. NATHAN 3,050,181
SPECTACLE CASE

Filed Jan. 27, 1961 2 Sheets-Sheet 2

INVENTOR
E. NATHAN

BY

ATTORNEY

3,050,181
Patented Aug. 21, 1962

3,050,181
SPECTACLE CASE
Emanuel Nathan, South Orange, N.J., assignor to The Opticase Co., Newark, N.J., a partnership
Filed Jan. 27, 1961, Ser. No. 85,428
1 Claim. (Cl. 206—5)

This invention relates to spectacle cases such as are used for the holding of spectacle frames. It has been customary, in this art, to form such spectacle cases of three parts including a bridge piece positioned within the channel shaped plate and secured thereto by riveting or other means.

Such constructions of the prior art have been found disadvantageous in limiting the range of frames which may be used in such cases to those whose bridge size conforms to the nose block.

The spectacle case of this invention is formed of two parts—eliminating the nose block, without sacrificing rigidity and strength and permitting a wide range of frames to be dispensed in the case without limitation to bridge size.

Figure 1:
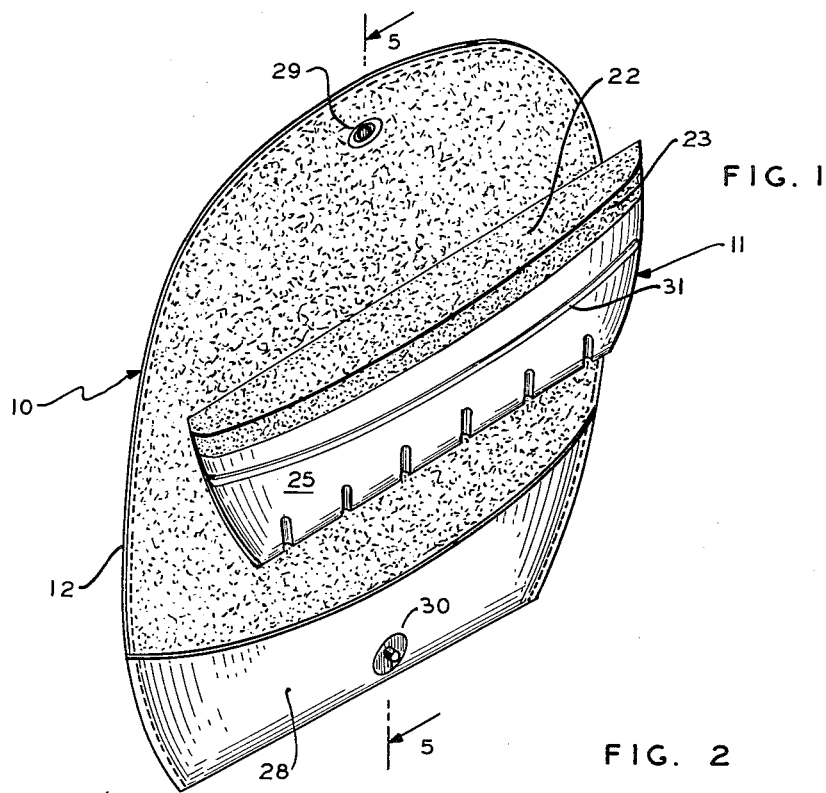
Figure 2:
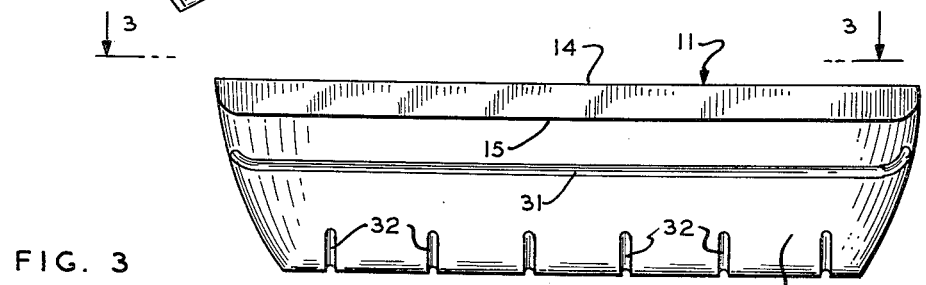
Figure 3:
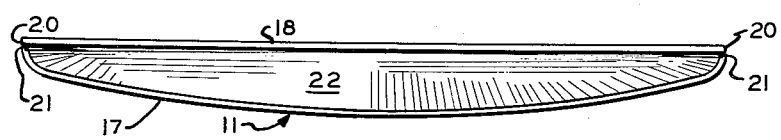
Figure 4:
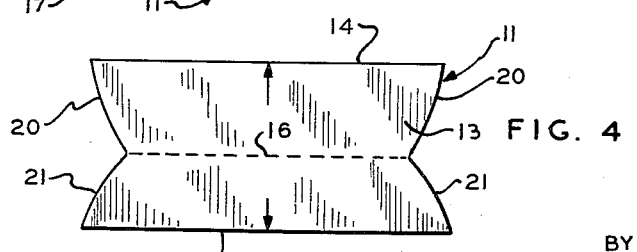
Figure 5:
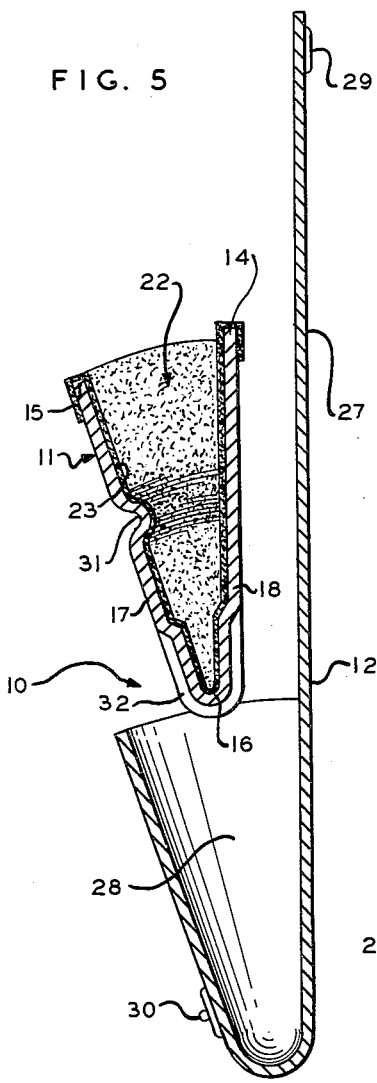
Figure 6:
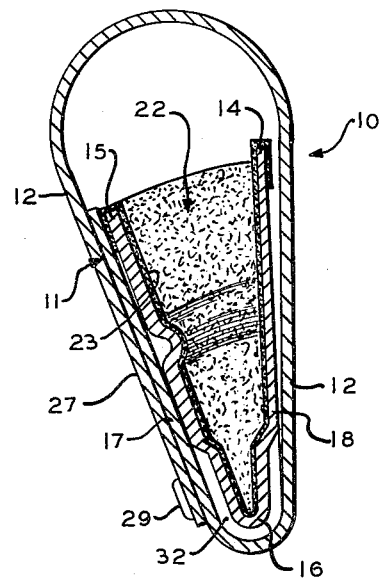
Figure 7:
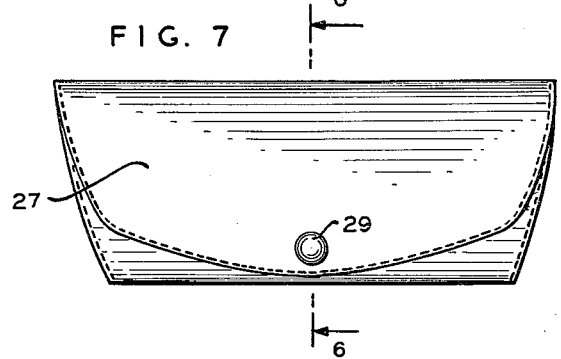

The spectacle case of this invention incorporates further novel features below described and shown in the accompanying drawings wherein:

FIG. 1 is a perspective, exploded view of a spectacle case embodying this invention, FIG. 2 is a side elevational view of the plate member thereof, FIG. 3 is a top plan view thereof taken at line 3—3 of FIG. 2, FIG. 4 is a plan view of the plate member blank before being formed as in FIG. 2 and covered as in FIG. 5, FIG. 5 is a vertical transverse sectional view taken at line 5—5 of FIG. 1, FIG. 6 is an enlarged transverse sectional view taken at line 6—6 of the FIG. 7 spectacle case embodying the invention and shown in closed position, and FIG. 7 is a front elevational view thereof.

In the drawings, FIG. 1 shows a spectacle case embodying the invention comprising two parts, namely, plate member 11 (FIGS. 2, 3 and 4) preferably formed from a flat blank 13 of metal or other bendable material cut or otherwise formed to define a pair of parallel longitudinal edges 14, 15 and bendable or foldable as indicated at the dotted line 16 intermediate said edges to form the blank into front and rear wall members 17, 18 (FIG. 5) one of which—17 for example—may be shorter than the other. Said wall members are connected at the fold end 16 and open at their free ends as shown in FIG. 5 to define a V-shaped upwardly opening unitary unobstructed channel 22 to receive spectacle frames therein of a wide variety and range of sizes.

The ends 20, 21 of the wall members 17, 18 are formed arcuately upwardly; on completion of the blank (FIG. 1) the front wall 17 is bowed longitudinally and the ends 20, 21 are brought together to close the frame receiving channel 22. The inner faces of the wall members 17, 18 may be covered by a flexible sheet 23 (FIGS. 5 and 6) which may be extended over the free longitudinal edges 14, 15 of said wall members. One of the wall members may as above noted be formed of slightly less height than the other to facilitate inserting and removing the frames.

The second part 10 of the spectacle case comprises a flexible closure member 12 which may be made of any suitable flexible material, for example, a flexible sheet folded and stitched or otherwise formed at one end to define a channel shaped pocket 28 to receive the completed frame holder 25 (FIG. 1). Said flexible closure member 12 has an extended flap 27 adapted (FIG. 6) to be folded over the pocket 28, with complementary fastening means 29, 30 (FIGS. 5 and 6) on said flap 27 and pocket 28 to be interengaged to close the spectacle case (FIG. 7).

One of the wall members, preferably the front wall member 17 is formed with a rib 31 spaced in parallel relation to the longitudinal edge 15 thereof and with transversely formed ribs 32, spaced from the rib 31 parallel thereto and adjacent the lower fold end 16 of said wall member.

As will be appreciated from a consideration of the foregoing, the device of this invention lends itself readily to manufacture in quantity production with great accuracy and is highly efficient and practical in operation and use. The present invention thus obviates the necessity for nose pieces, is inherently rigid and sturdy and is far more versatile and adaptable for practical use than spectacle cases of conventional forms well known in this art.

Having thus described my invention, what I claim as new and desire to secure by Letters Patent is:

A two part spectacle case, one part of said case comprising an elongated plate member formed to define a pair of parallel longitudinal edges and bendable intermediate said edges axially longitudinally to define a pair of upwardly extending wall members defining a V-shaped unitary channel to receive spectacle frames therein of the size range accommodated by said channel, the ends of said wall members being formed arcuately from the axial longitudinal intermediate point of bending said plate, one of said wall members being of lesser height than the other, a rib on one of said wall members in spaced parallel relation to the longitudinal edge thereof reenforcing said wall member, transversely formed spaced ribs contiguous to the point of bending said plate extending from the lower end of said wall member, and a flexible holder defining the other part of the spectacle case and comprising an elongated flexible sheet formed at one end to define a pocket to receive the plate member and having a connected flap extending therefrom and adapted to be folded over the plate member, said plate member being so proportioned that it may be positioned in the pocket of the flexible holder and the flap folded over the pocket of the holder to thus enclose the plate member therein.

References Cited in the file of this patent
UNITED STATES PATENTS

| | | |
|---|---|---|
| 993,404 | Price | May 30, 1911 |
| 2,725,914 | Daum | Dec. 6, 1955 |

FOREIGN PATENTS

| | | |
|---|---|---|
| 237,291 | Switzerland | Aug. 1, 1945 |